(12) United States Patent
Rossini et al.

(10) Patent No.: US 9,829,705 B2
(45) Date of Patent: Nov. 28, 2017

(54) HEAD-UP DISPLAY PROVIDING AN IMPROVED VIEWING COMFORT

(71) Applicant: Commissariat à L'énergie Atomique et aux énergies Alternatives, Paris (FR)

(72) Inventors: Umberto Rossini, Coublevie (FR); Henri Doyeux, Beaucroissant (FR); Denis Sarrasin, Sassenage (FR)

(73) Assignee: Commissariat À L'Énergie Atomique et aux Énergies Alternatives, Paris (FR)

( * ) Notice: Subject to any disclaimer, the term of this patent is extended or adjusted under 35 U.S.C. 154(b) by 0 days.

(21) Appl. No.: 14/089,001

(22) Filed: Nov. 25, 2013

(65) Prior Publication Data

US 2014/0145916 A1    May 29, 2014

(30) Foreign Application Priority Data

Nov. 29, 2012 (FR) .................................. 12 61399

(51) Int. Cl.
   *G09G 5/00* (2006.01)
   *G02B 27/01* (2006.01)

(52) U.S. Cl.
   CPC .......... *G02B 27/017* (2013.01); *G02B 27/01* (2013.01); *G02B 2027/0161* (2013.01)

(58) Field of Classification Search
   CPC ................. G02B 27/017; G02B 27/01; G02B 2027/0161; G02B 27/0172; G02B 2027/0132
   USPC .............................................................. 345/8
   See application file for complete search history.

(56) References Cited

U.S. PATENT DOCUMENTS

| | | | |
|---|---|---|---|
| 4,591,844 A | 5/1986 | Hickin et al. | |
| 2002/0005819 A1* | 1/2002 | Ronzani et al. | 345/8 |
| 2007/0097140 A1 | 5/2007 | Fenney et al. | |
| 2011/0050655 A1* | 3/2011 | Mukawa | 345/204 |
| 2011/0252381 A1* | 10/2011 | Chaudhri | 715/838 |
| 2013/0135353 A1* | 5/2013 | Wheeler | G09G 3/003 345/660 |

OTHER PUBLICATIONS

Robert D. Brown, et al., "High Resolution LCD Projector for Extra-Wide Field of View Head-Up Display", "http://proceedings.spiedigitallibrary.org", Apr. 22, 2003, pp. 320-329, vol. 5080, Publisher: Cockpit Displays X, Proceedings of SPIE—The International Society for Optical Engineering, Published in: US.
Adam Cohen, "Search Report for French Priority Patent Application No. FR 12/61399", dated Jul. 17, 2013, Publisher: INPI, Published in: FR.

* cited by examiner

*Primary Examiner* — Towfiq Elahi
(74) *Attorney, Agent, or Firm* — Kaplan Breyer Schwarz, LLP

(57) ABSTRACT

A head-up display including a display screen including an array of display pixels arranged in rows and in columns, where the display screen is pivoted, around an axis perpendicular to the screen, by an inclination angle between 10 and 80 degrees, with respect to the position of the display screen for which a group of adjacent activated display pixels of a same row appears to an observer as being directed along the horizontal or vertical direction.

9 Claims, 2 Drawing Sheets

HEAD-UP DISPLAY PROVIDING AN IMPROVED VIEWING COMFORT

This application claims the priority benefit of French Patent application number 12/61399, filed on Nov. 29, 2012, entitled "Viseur tête haute à confort de visualisation amélioré", the contents of which is hereby incorporated by reference in its entirety to the maximum extent allowable by law.

BACKGROUND

The present invention relates to a head-up display, comprising a display screen having a pixel array.

DISCUSSION OF THE RELATED ART

Head-up displays or HUDs are augmented reality display systems which enable to integrate visual information on a real scene seen by an observer. In practice, such systems may be placed in a helmet visor, in the cockpit of a plane, or in the interior of a vehicle. They are thus positioned at a short distance from the user's eyes, for example, at a few centimeters or tens of centimeters.

The visual information is provided by a display screen. Conventionally, it is a cathode-ray tube screen, generally with a vector display system. The current tendency is to replace the cathode-ray tube screens of head-up displays with liquid crystal or light-emitting diode display screens having a pixel array.

However, when a line, which is almost horizontal but not quite, is to be displayed on a display screen having a pixel array, the observer clearly sees a very staggered broken line, which is uncomfortable. Further, for certain types of displays, especially comprising an array of organic light-emitting diodes, the displaying of a vertical line on the screen may cause significant current inrushes. This can make the use of display screens having a pixel array in head-up displays difficult.

SUMMARY

Thus, an embodiment provides a head-up display comprising a display screen comprising an array of pixels arranged in rows and in columns, wherein the display screen is pivoted, around an axis perpendicular to the screen, by an inclination angle between 10 and 80 degrees, with respect to the position of the display screen for which a group of adjacent activated display pixels of a same row appears to an observer as being directed along the horizontal or vertical direction.

According to an embodiment, the screen is a screen with light-emitting diodes.

According to an embodiment, the screen is a screen with organic light-emitting diodes.

According to an embodiment, the screen is a liquid-crystal display screen.

According to an embodiment, the display comprises a control unit of the display screen capable of determining a first digital image comprising an array of image pixels, of determining a second digital image from the first digital image, the second image corresponding to the rotation of the first image by an angle opposite to the inclination angle and of controlling the display of the second image on the display screen.

According to an embodiment, the display screen comprises a circuit for activating the display pixels, the display further comprising a control unit of the display screen capable of determining a first digital image comprising an array of image pixels and of providing control signals to the activation circuit for the display of the first image, the activation circuit being capable of modifying the control signals for the display of a second digital image corresponding to the rotation of the first image by an angle opposite to the inclination angle.

According to an embodiment, the inclination angle is in the range between 15 and 40 degrees with respect to the horizontal or vertical direction.

According to an embodiment, the inclination angle is in the range between 20 and 30 degrees with respect to the horizontal or vertical direction.

According to an embodiment, the display further comprises a beam splitter having the images provided by the display screen projected thereon.

According to an embodiment, the display further comprises an optical system capable of collimating at infinity the image displayed on the display screen.

The foregoing and other features and advantages will be discussed in detail in the following non-limiting description of specific embodiments in connection with the accompanying drawings.

BRIEF DESCRIPTION OF THE DRAWINGS

For clarity, the same elements have been designated with the same reference numerals in the various drawings and, further, as usual in the representation of circuits, the various drawings are not to scale.

DETAILED DESCRIPTION

In the following description, unless otherwise indicated, terms "almost", "substantially", "approximately", and "in the order of" mean "to within 10%".

Figure 1:
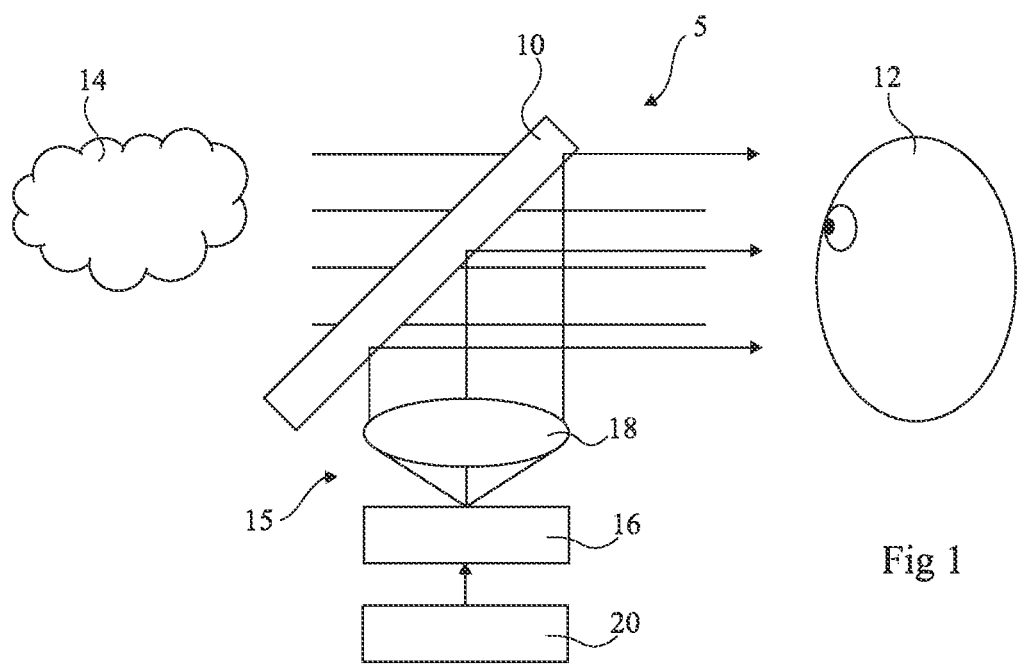
FIG. 1 shows in the form of a block diagram an example of head-up display.

FIG. 1 schematically illustrates the operation of a head-up display 5.

A beam splitter 10 is placed between the eye of a user 12 and a scene to be observed 14. The objects of scene 14 to be observed are generally located at infinity or at a long distance from observer 12. Beam splitter 10 is inclined according to a 45° angle with respect to an axis connecting scene 14 and observer 12. Beam splitter 10 enables to transmit the information originating from scene 14 to observer 12 without altering this information.

A projection system 15 is provided to project an image seen by observer 12 at the same distance as the real image of scene 14 and to superpose it thereto. This system comprises a display screen 16 located at the primary focal point of an optical system 18. Display screen 16 is controlled by a display screen control unit 20 which determines the images to be displayed, for example, from signals provided by sensors, not shown.

Projection system 15 is placed perpendicularly to the axis connecting scene 14 and observer 12 so that the beam originating from optical system 18 reaches beam splitter 10 perpendicularly to this axis. The beam originating from optical system 18 thus reaches beam splitter 10 with a 45° angle with respect to its surface and is reflected towards observer 12. The image displayed on screen 16 is collimated at infinity by optical system 18. Observer 12 does not have to make any effort of accommodation, which limits his visual fatigue. Beam splitter 10 combines the image of scene 14 and the image originating from projection system 15, whereby observer 12 visualizes an image comprising the projected image superposed to the image of scene 14.

Display screen 16 may be a display screen having a pixel array. It may be a monochrome screen or a color screen. The smallest element of a digital image capable of being displayed by a display 16 is called image pixel. The smallest element of screen 16 to display an image is called display pixel. For a color screen, the displaying of an image pixel may require a plurality of display pixels, for example, red, green, and blue pixels. The display pixels of a display screen are regularly distributed in rows and in columns. A monochrome display screen 16 for example comprises between 300 and 1,000 rows and 300 and 1,000 columns. To display images generally having a circular shape, screens substantially having the same number of rows and of columns may advantageously be used. Display screen 16 for example is a liquid crystal display or LCD screen. It may also be a light-emitting diode display screen, for example, an organic light-emitting diode or OLED display screen.

Figure 2:
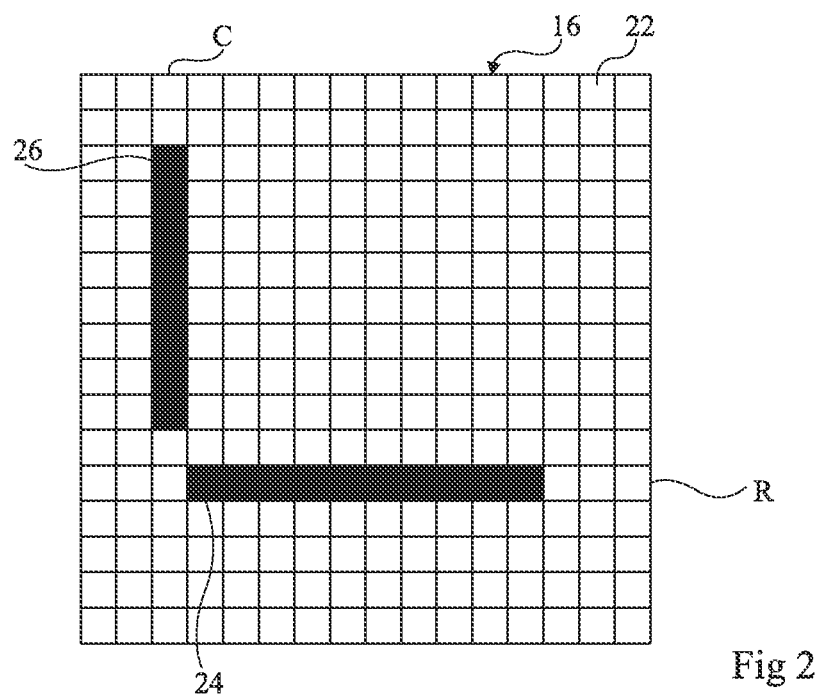
FIG. 2 schematically shows a conventional display screen having a pixel array having a horizontal segment and a vertical segment displayed thereon.

FIG. 2 shows an example of display screen 16 comprising an array of display pixels 22 arranged in 16 rows and 16 columns. An activated display pixel, that is, which projects a light signal, is schematically shown as a black square, and a non-activated display pixel, that is, which projects no light signal, is shown as a white square. Generally, the image provided by display screen 16 in a head-up display is a relatively simple image comprising information useful for observer 12, and especially the information provided by on-board instruments. Such images may, by a wide extent, be formed from segments of straight lines. As an example, two segments 24, 26 are shown in FIG. 2. Segment 24 is a segment obtained by the activation of adjacent display pixels of a same row R of screen 16 and segment 26 is obtained by the activation of adjacent display pixels of a same column C.

Screen 16, optical system 18, and beam splitter 10 are conventionally arranged relative to one another so that segment 24 is perceived as being horizontal by observer 12 and that segment 26 is perceived as being vertical by observer 12.

The previously-described projection system 15 has the following disadvantage: for certain applications, in particular when the head-up display equips the cockpit of a plane, visual information representing the artificial horizon is displayed. The artificial horizon is generally displayed as one or a plurality of segments of straight lines. When the plane has no angle of roll, the segment representing the artificial horizon is horizontal, which may correspond to segment 24 of FIG. 2, and when the angle of roll of the plane is non zero, the segment is displayed as being inclined with respect to the horizontal direction. In practice, even when the plane is in a phase of stabilized flight, the angle of roll however tends to slightly oscillate around zero. This translates as slight oscillations of the segment representing the artificial horizon with respect to the horizontal direction.

Figure 3:
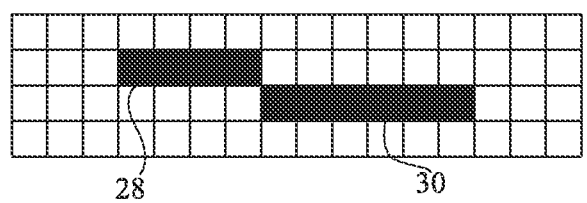
FIG. 3 shows a portion of a conventional display screen having a pixel array having a quasi-horizontal segment displayed thereon.

FIG. 3 schematically shows a portion of the screen having the level of an artificial horizon slightly inclined with respect to the horizontal direction displayed thereon. The artificial horizon is represented by a plurality of adjacent groups of adjacent pixels of different adjacent rows, two groups 28, 30 being shown in FIG. 3. Since groups 28, 30 may have a large number of pixels, observer 12 does not perceive the horizon level as a continuous segment, but as a series of stages, which is uncomfortable. Further, a small variation of the angle of roll may cause a significant displacement of the activated groups of pixels 28, 30, which is also uncomfortable.

The use of screen 16, as shown in FIG. 2, thus has another disadvantage, described hereafter, when the screen comprises light-emitting diodes, for example, organic light-emitting diodes.

Figure 4:
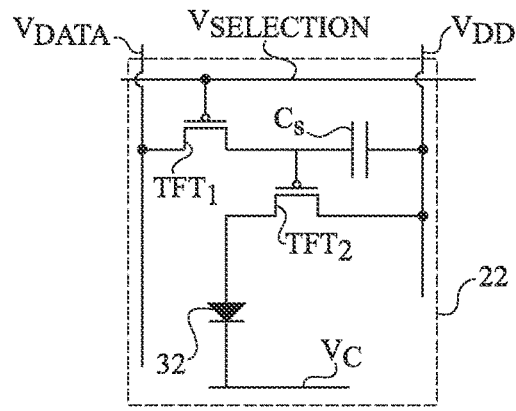
FIG. 4 partially and schematically shows an example of an organic light-emitting diode display screen.

FIG. 4 partially and schematically shows an embodiment of a display pixel 22 of an OLED screen. Each display pixel 22 comprises an organic light-emitting diode 32, two field-effect transistors $TFT_1$ and $TFT_2$, for example, thin-film transistors, and a capacitor $C_S$. The cathode of diode 32 is connected to a cathode electrode $V_C$ which may be common to all the display pixels 22 of the screen. For each row of the screen, a selection line $V_{SELECTION}$ is connected to the gate of transistor $TFT_1$ of all the display pixels in the row. For each column of the screen, a line of transmission of a data signal $V_{DATA}$ is connected to one of the conduction terminals of transistor $TFT_1$ of each display pixel of the column. The other conduction terminal of transistor $TFT_1$ is connected to an armature of capacitor $C_S$ and to the gate of transistor $TFT_2$. For each screen column, a power supply line $V_{DD}$ is connected, for each display pixel 22 of the column, to the other armature of capacitor $C_S$ and to a conduction terminal of transistor $TFT_2$, the other conduction terminal of transistor $TFT_2$ being connected to the anode of diode 32.

During the activation of display pixel 22, diode 32 conducts a current transmitted by power supply line $V_{DD}$ and having an intensity depending on the desired radiation of the display pixel. For observer 12 to be able to properly see the visual information displayed by the head-up display, it is desirable for the luminance of the activated display pixels of screen 16 to be at least 40,000 candelas/m². To display a vertical segment, for example, segment 26 shown in FIG. 2, adjacent display pixels of a same column should be activated simultaneously. A disadvantage of display array 16 is that power supply line $V_{DD}$ is connected to all the display pixels 22 of a same column. Thereby, the total current intended to flow in power supply line $V_{DD}$, for the simultaneous activation of a group of display pixels of a same column, may be greater than several milliamperes. This imposes heavy constraints on design of display screen 16 regarding the dimensions of the metal tracks used to form power supply lines $V_{DD}$, to ensure that power supply lines $V_{DD}$ can properly conduct such currents.

Thus, an object of an embodiment is to provide a head-up display comprising a display screen having a pixel array at least partly overcoming some of the disadvantages of existing systems.

Another object of an embodiment is to improve the comfort of perception of the visual information projected by the head-up display.

Another object of an embodiment is to decrease the intensity peaks of the currents used during the operation of the display screen.

Another object of an embodiment is to be able to form the head-up display with a liquid crystal display screen or a light-emitting diode display screen, in particular comprising organic light-emitting diodes.

The present invention aims at modifying the position of display screen 16 with respect to optical system 18 and/or to beam splitter 10 as compared with the conventional position of display screen 16 for which observer 12 sees a horizontal (or possibly vertical) segment when adjacent display pixels of a same row of screen 16 are activated. The present invention comprises directing display screen 16 with respect to optical system 18 and to beam splitter 10 so that observer 12, instead of seeing a horizontal (or vertical) segment when the display pixels of a row of the display screen are activated, sees a segment inclined with respect to the horizontal direction by an inclination angle $\alpha$. Similarly, observer 12, instead of seeing a vertical (or horizontal) segment when the display pixels of a column of the display screen are activated, sees a segment inclined with respect to the vertical direction by an inclination angle $\alpha$.

Inclination angle $\alpha$ is preferably in the range between 15° and 60°, more preferably between 18° and 45°, more preferably still between 20° and 30°, for example, in the order of 27°.

In the example of head-up display 5 shown in FIG. 1, this may be obtained by pivoting display screen 16, around the optical axis of optical system 18, by inclination angle $\alpha$ from the conventional position of screen 16.

Figure 5:
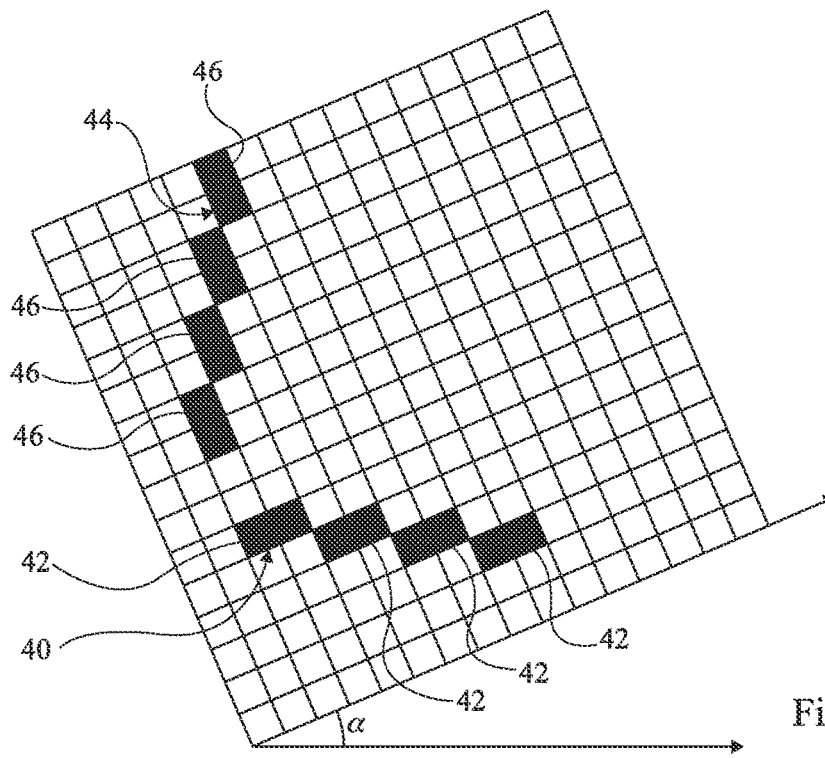
FIG. 5 shows an example of display screen according to an embodiment.

Thereby, display pixels of display screen 16 belonging to different rows and columns have to be activated to display an element which is perceived by observer 12 as being directed along the horizontal direction. An example of such an element 40 is shown in FIG. 5 and comprises four groups 42 of two pixels belonging to four different rows.

Similarly, display pixels of the display screen belonging to different rows and columns have to be activated to display an element which is perceived by observer 12 as being directed along the vertical direction. An example of such an element 44 is shown in FIG. 5 and comprises four groups 46 of two pixels belonging to four different columns.

The two previously-described disadvantages when display screen 16 is in the conventional position have disappeared.

Indeed, the displaying of a perfectly horizontal or of a quasi-horizontal element corresponds, in both cases, to the activation of groups of display pixels, for example each comprising between 5 and 20 display pixels belonging to at least two rows and to a plurality of different columns. The number and the position of the groups of display pixels and the number of display pixels per group of display pixels scarcely change on transition between the displaying of a perfectly horizontal element and the displaying of a quasi-horizontal element. Thereby, this transition is perceived more smoothly by observer 12, which makes it more comfortable.

Further, the currents conducted by the conductive tracks associated with the columns of a light-emitting diode display screen are decreased on display of a vertical element since display pixels belonging to a plurality of different columns are then activated.

According to an embodiment, control unit 20 is capable of directly providing digital images adapted to a display screen inclined by inclination angle $\alpha$.

According to another embodiment, the digital images to be displayed, which are determined or received by control unit 20, correspond to first digital images adapted to a display screen arranged according to the previously-described conventional position. In this case, display unit 20 may, for each first digital image to be displayed, determine a second digital image corresponding to the first digital image to which is applied a mathematical transformation corresponding to a rotation by an angle equal to the opposite of inclination angle $\alpha$ by taking, for example, as a rotation center, the center of the first digital image. Unit 20 then controls display screen 16 to display the second digital image.

According to a variation, unit 20 controls display screen 16 for the display of the first digital image by transmitting adapted control signals to display screen 16 and the circuit for activating the display pixels 22 of display screen 16 comprises circuits for modifying the control signals to display a second digital image corresponding to the rotation of the first image by an angle opposite to inclination angle $\alpha$.

Generally, the data to be displayed are located inside of a circle having the center of the display screen as a center and having its radius corresponding to half the width or the height of the display screen. Thereby, after application of a mathematical transformation corresponding to a rotation by an angle opposite to inclination angle $\alpha$, all the data to be displayed are also present in the final digital image. There is thus no lost information. The rotation by angle $-\alpha$ may be applied by digital processing by control unit 20. As a variation, the rotation by angle $-\alpha$ may be applied to the digital image directly by the selection circuits of the display screen.

Figure 6:
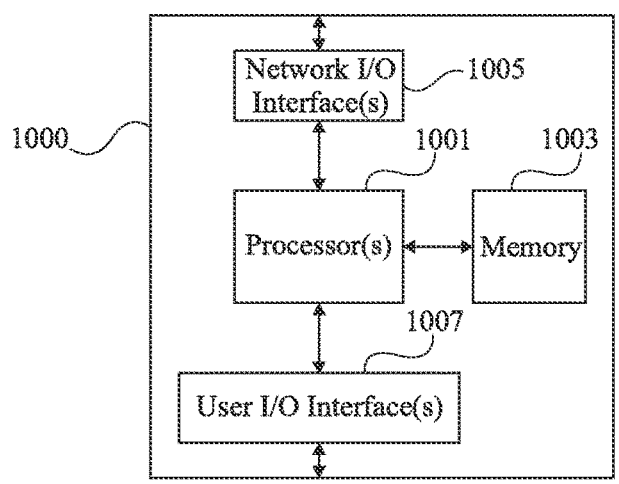
FIG. 6 shows in the form of a block diagram an embodiment of the control unit of FIG. 1.

FIG. 6 is a block diagram of a calculation device 1000 which may be used to form control unit 20. Calculation device 1000 may comprise one or a plurality of processors 1001 and one or a plurality of non-transitory computer-readable storage media (for example, memory 1003). Memory 1003 may store, in non-transitory computer-readable storage means, computer program instructions which, when executed, implement the previously-described functions performed by control unit 20. Processor(s) 1001 may be coupled to memory 1003 and may execute such computer program instructions to implement these functions.

Calculation device 1000 may also comprise a network input/output interface 1005 (Network I/O Interface(s)) through which the calculation device can communicate with other calculation devices (for example, over a network), and may also comprise one or a plurality of user interfaces 1007 (USER I/O Interface(s)) through which the calculation device can provide output signals to a user and receive input signals from the user. The user interfaces may comprise peripherals such as a keyboard, a mouse, a microphone, a display peripheral (for example, a monitor or a touch screen), speakers, a camera, and/or various other types of input/output peripherals.

The previously-described embodiments may be implemented in several ways. As an example, the embodiments may be implemented by means of a dedicated circuit, of software, or of a combination thereof. When they are implemented by software, the software code can be executed on any suitable processor (for example, a microprocessor) or a set of processors, be they provided in a single calculation device or distributed between a plurality of calculation devices. It should be noted that any component or component assembly which performs the previously-described functions can be considered as one or a plurality of controllers which control the previously-described functions. The controller or the controllers may be implemented in many ways, for example, with a dedicated electronic circuit or with a general-purpose circuit (for example, one or a plurality of processors) which is programmed by means of software or of a microcode to execute the above-described method steps.

In this respect, it should be noted that an embodiment described herein comprises at least one computer-readable storage medium (RAM, ROM, EEPROM, flash or another memory technology, CD-ROM, digital video disk (DVD) or another optical disk support, magnetic cassette, magnetic tape, magnetic storage disk or another magnetic storage device, or another non-transitory computer-readable storage support) coded with a computer program (that is, a plurality of executable instructions) which, when executed on a processor or a plurality of processors, performs the functions of the previously-described embodiments. The computer-readable medium may be portable so that the program stored thereon can be loaded on any calculation device to implement aspects of the techniques described herein. It should further be noted that the reference to a computer program which, when executed, performs any of the previously-described functions, is not limited to an application program executing on a host computer. On the contrary, terms computer program and software are used herein in a general sense to refer to any type of computer code (for example, application software, firmware, a microcode, or any form of computer instruction) which may be used to program one or a plurality of processors to implement aspects of the techniques described herein.

Specific embodiments have been described. Various alterations, modifications, and improvements will readily occur to those skilled in the art. In particular, in the case of an application in the automobile field, the beam splitter of the display may be part of the windshield of the automobile vehicle. Further, in the case of a head-up display equipping a helmet, the beam splitter of the display may be part of the helmet visor.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A head-up display comprising a projection system and a beam splitter, the projection system projecting an image onto the beam splitter and the beam splitter directly reflecting the projected image towards an observer, the projection system comprising a display screen comprising a surface on which the image is formed and an optical system defining an optical axis perpendicular to said surface, the display screen comprising an array of display pixels arranged in rows and in columns, wherein the display screen is pivotable relative to the beam splitter around the optical axis of the optical system, by an inclination angle between 10 and 80 degrees, and wherein when the display screen is pivoted around the optical axis by the inclination angle between 10 and 80 degrees, certain display pixels of the array of display pixels in different ones of the rows and in different ones of the columns are activated to display an element which appears to the observer as being directed along the horizontal or vertical direction, the optical axis remaining perpendicular to the surface of the display screen as the display screen is pivoted around the optical axis by the inclination angle.

2. The head-up display of claim 1, wherein the display screen is a screen with light-emitting diodes.

3. The head-up display of claim 2, wherein the display screen is a screen with organic light-emitting diodes.

4. The head-up display of claim 1, wherein the display screen is a liquid crystal display screen.

5. The head-up display of claim 1, comprising a control unit of the display screen capable of determining a first digital image comprising an array of image pixels, of determining a second digital image from the first digital image, the second image corresponding to the rotation of the first image by an angle opposite to the inclination angle and of controlling the display of the second image on the display screen.

6. The head-up display of claim 1, wherein the display screen comprises a circuit for activating the display pixels, the display further comprising a control unit of the display screen capable of determining a first digital image comprising an array of image pixels and of providing control signals to the activation circuit for the display of the first image, the activation circuit being capable of modifying the control signals for the display of a second digital image corresponding to the rotation of the first image by an angle opposite to the inclination angle.

7. The head-up display of claim 1, wherein the inclination angle is between 15 and 40 degrees with respect to the horizontal or vertical direction.

8. The head-up display of claim 1, wherein the inclination angle is between 20 and 30 degrees with respect to the horizontal or vertical direction.

9. The head-up display of claim 1, wherein the optical system is capable of collimating at infinity the image displayed on the display screen.

* * * * *